United States Patent
Kammiller et al.

[11] Patent Number: 5,864,471
[45] Date of Patent: Jan. 26, 1999

[54] ENERGY RECOVERY CIRCUIT FOR USE IN A CONVERTER

[76] Inventors: Neil A. Kammiller, 783 6th St., Lorain, Ohio 44052; Bruce A. Walsh, P.O. Box 183, Avon, Ohio 44011

[21] Appl. No.: 827,234

[22] Filed: Mar. 28, 1997

[51] Int. Cl.$^6$ .................................................. H02M 3/335
[52] U.S. Cl. ............................................ 363/17; 363/132
[58] Field of Search ................................. 363/17, 16, 37, 363/39, 40, 41, 44, 45, 95, 97, 98, 131, 132

[56] References Cited

U.S. PATENT DOCUMENTS

| | | | |
|---|---|---|---|
| H335 | 9/1987 | Milberger | 363/16 |
| 4,607,322 | 8/1986 | Henderson . | |
| 4,691,270 | 9/1987 | Pruitt | 363/56 |
| 4,706,181 | 11/1987 | Mercer . | |
| 4,709,323 | 11/1987 | Lien . | |
| 4,716,509 | 12/1987 | Roccucci . | |
| 4,977,493 | 12/1990 | Smith . | |
| 5,117,347 | 5/1992 | Robello et al. . | |
| 5,198,969 | 3/1993 | Redl . | |
| 5,367,448 | 11/1994 | Carroll | 363/89 |
| 5,400,235 | 3/1995 | Carroll . | |
| 5,410,467 | 4/1995 | Smith et al. . | |
| 5,444,594 | 8/1995 | Tanaka et al. | 361/58 |
| 5,446,366 | 8/1995 | Bassett et al. . | |
| 5,550,458 | 8/1996 | Farrington et al. . | |
| 5,576,943 | 11/1996 | Keir . | |
| 5,642,267 | 6/1997 | Brkovic et al. . | |

*Primary Examiner*—Adolf Berhane
*Attorney, Agent, or Firm*—Fay, Sharpe, Beall, Fagan, Minnich & McKee

[57] ABSTRACT

A full-bridge converter circuit which implements an energy recovery circuit. The energy recovery circuit provides clamping of an output diode reverse voltage to a primary bank voltage of an inverter and is further configured to re-circulate excess absorbed energy to the inverter circuit.

14 Claims, 9 Drawing Sheets

ENERGY RECOVERY CIRCUIT FOR USE IN A CONVERTER

BACKGROUND OF THE INVENTION

The invention pertains to the art of switching circuits and is applicable to full-bridge DC/DC converters which have minimal drain voltage on the switches during a turn on. Switching circuits having the above attribute being commonly known as resonant or soft switching full-bridge converters.

It will be appreciated, however, that the invention has broader applications and may be advantageously employed in other environments and applications that wish to achieve minimization of energy loss.

Resonant or soft switching circuits are often employed due to their characteristics of reduction of power losses which allow for high efficiency switching and reduction of electromagnetic interference (EMI) generation. It is known, however, that even with such circuits switching losses due to the use of rectifier diodes are not substantially diminished. Further, the combination of the reverse-recovery process of the rectifier diodes with the leakage inductance of the transformer causes voltage overshoot and ringing that will lead to excessive dynamic losses or the failure of the rectifier diodes. The severity of this problem will tend to increase as the rectifier diode breakdown-voltage rating increases, since the diode reverse-recovery time increases with increasing voltage rating.

It is well known that diode recovery losses can be reduced by the insertion of an inductor in series with the power transformer primary. Another advantage of this inductor is to reduce the converter load value at which resonant transition occurs.

Various solutions to voltage overshoot have been proposed including the use of clamping circuits, and RC snubbers connected across the rectifier diodes. U.S. Pat. No. 5,198,969 is illustrative of such attempted solution. This patent includes clamp diodes connected to provide a path to the input supply to reduce switching losses and voltage stresses of rectifier diodes. This circuit acts to block the transmission of excessive energy from the primary side of the circuit to the secondary rectifier circuit through the use of the clamping diodes.

It has been found, however, that the above proposed solutions are relatively inefficient and/or complex, and while reducing voltage overshoot, some also may dissipate or otherwise remove energy from the circuit thereby reducing the efficiency of the circuit.

Therefore, it has been deemed desirable to find a circuit which will reduce the voltage overshoot in a resonant bridge converter, which will also recover energy otherwise lost in the process of eliminating the voltage overshoot.

SUMMARY OF THE INVENTION

The present invention contemplates a new and improved energy recovery circuit used in conjunction with a full-bridge DC/DC converter which limits voltage overshoot and at the same time recovers energy for use in the converter.

In a more limited aspect of the present invention, the energy recovery circuit of the present invention absorbs excess energy stored in leakage inductance within the transformer primary and secondary windings and provides a low leakage path for the absorbed energy back to the converter.

In accordance with another aspect of the present invention, increased efficiency is achieved in the recovery circuit by the appropriate positioning of the windings of the transformer.

According to yet another aspect of the present invention, the energy recovery circuit uses an auxiliary winding and a diode bridge to absorb excess energy which is then returned to the primary of the converter circuit.

A principal advantage of the invention is provision of an energy recovery circuit which clamps output diode reverse voltage to a primary bank voltage of the converter circuit.

Another advantage of the present invention resides in an increase in circuit efficiency due to the absorbing and returning of energy stored in the leakage inductance in the transformer which would otherwise have to be dissipated as heat in resistive elements.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
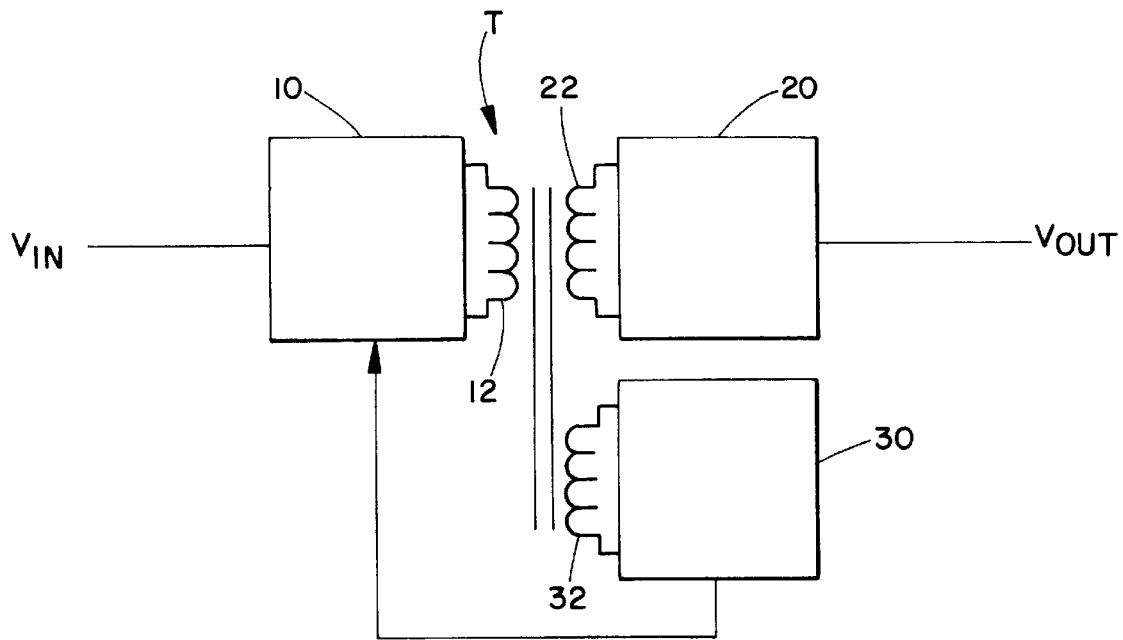
FIG. 1 is a block diagram of a converter circuit implementing the energy recovery circuit of the present invention.

Referring now to the drawings wherein the showings are for the purposes of illustrating the preferred embodiment of the invention only and not for purposes of limiting same, FIG. 1 shows a simplified block diagram of inverter circuit 10, rectifier output circuit 20 and energy recovery circuit 30, which are magnetically linked to each other via windings 12, 22 and 32. The inverter circuit 10, rectifier output circuit 20, and windings 12 and 22 of transformer T, comprise an example of a generally known converting circuit. During normal operation inverter circuit 10 receives input voltage Vin which is inverted and transmitted to rectifier output circuit 20, wherein output voltage $V_{out}$ is generated.

It is known that with certain inverter circuit-transformer combinations excessive energy can pass to rectifier output circuits, thereby developing excessive voltage. It is also known that within rectifier output circuit 20 undesirable voltage spikes may occur during the transfer of energy from inverter circuit 10 to rectifier output circuit 20. To address the above problems, energy recovery circuit 30 is used to absorb excess energy generated by both inverter circuit 10 and rectifier output circuit 20. The absorbed energy is then delivered back to inverter circuit 10.

Such an arrangement eliminates undesirably high levels of energy in the form of high voltage spikes in rectifier output circuit 20, which if allowed to remain would require the use of less desirable output rectifiers. Additionally, unlike other circuits which attempt to minimize undesirably high energy levels generated by a converter or rectifier circuit by using snubbers or clamping circuits which simply dissipate the energy, energy recovery circuit 30 absorbs the excess energy and returns it to inverter circuit 10.

Figure 2:
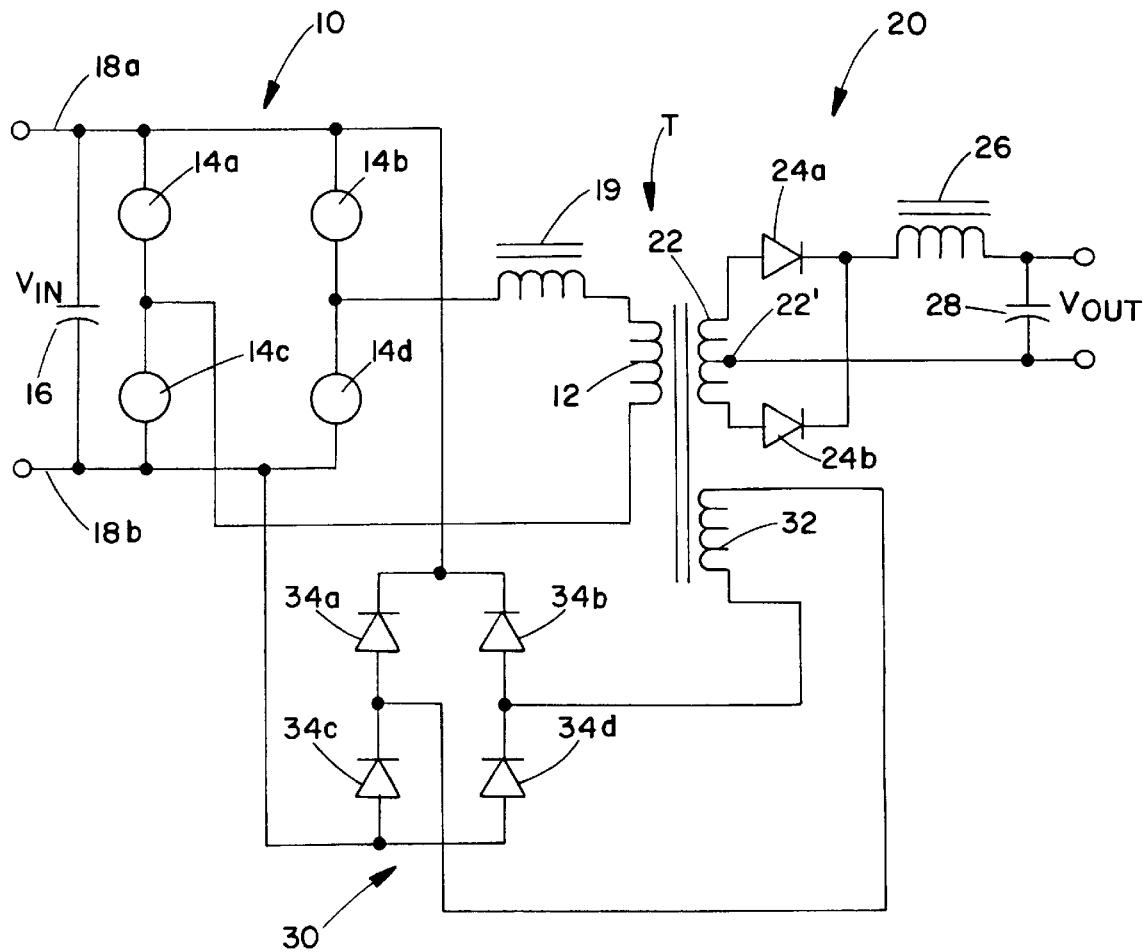
FIG. 2 is a more detailed schematic of the circuit in accordance with FIG. 1.

Turning attention to FIG. 2, a schematic is provided detailing inverter 10, rectifier output circuit 20 and energy recovery circuit 30.

Inverter circuit 10 is shown to be a full-bridge resonant transition inverting circuit having a bridge including switching elements 14a–14d. These switching elements may be field effect transistors (FETs). Bank capacitor 16 and FETS 14a–14d are interconnected between input power rails 18a–18b. During operation input voltage $V_{in}$ is inverted via switching elements 14a–14d and delivered to primary transformer winding 12. In FIG. 2 an inductance 19 is shown in series with primary transformer winding 12. Series inductance 19 can be an external series inductance or may be an inductance included in the construction of primary transformer winding 12. Using this arrangement, energy from inverter circuit 10 is transferred to rectifier output circuit 20 via transformer T.

Rectifier output circuit 20 includes a rectification section which in this embodiment includes rectifier diodes 24a and 24b. Also included in rectifier output circuit 20 is inductor 26 and capacitor 28. It is to be appreciated that inverter 10 and rectifier output circuit 20 are shown simply as examples and other inverting or rectifying output circuit configurations having different elements may be used.

Energy recovery circuit 30 includes auxiliary winding 32 magnetically linked to primary transformer winding 12 and secondary transformer winding 22. Energy is absorbed by auxiliary winding 32 and passed to an energy passing circuit comprised of a diode bridge including diodes 34a–34d. The diode bridge 34a–34d places energy absorbed by auxiliary winding 32 across the power rails 18a and 18b. By this arrangement, the circuit of FIG. 2 will absorb excess energy, which would otherwise be sent to rectifier output circuit 20, and circulates this energy back to the input of inverter 10. Particularly, in its most efficient arrangement, energy recovery circuit 30 is arranged to be placed between primary transformer winding 12 and secondary transformer winding 22 in order to both absorb energy above a predetermined level attempting to be transferred from the primary transformer winding 12 to the secondary transformer winding 22, and to also reduce leakage inductances associated with rectifier diodes 24a–24b in rectifier output circuit 20.

In accordance with its operation, auxiliary winding 32 absorbs energy generated due to series inductance 19 of inverter 10. Inductance 19 may be an actual external inductor or an inductance built into the transformer windings. Also, energy absorbed can be generated due to leakage inductance of the transformer itself, inductance due to an extra core of the transformer or at other locations in inverter 10. Wherever the inductances which cause resonant drain voltage transitions are located in inverter 10 or transformer T, auxiliary winding 32 will absorb the excess energy from these locations and return it through diodes 34a–34d to capacitor 16 in inverter 10.

By positioning auxiliary winding 32 between primary transformer winding 12 and secondary transformer winding 22, auxiliary winding 32 is able to absorb excess energy that is attempting to be transferred from primary transformer winding 12 to secondary transformer winding 22 in an efficient manner. The auxiliary winding 32, due to its position, is also able to absorb trapped energy, such as that in parasitic leakage inductance within secondary transformer winding 22.

It is known that the use of rectifier diodes 24a–24b result in the existence of significant voltage spikes during transitions of the circuit. Particularly, when a diode is in a conducting state, there is substantially zero voltage and zero ohms on the diode. However, when the diode transitions to a non-conducting state, a very high impedance, substantially infinite ohms exist. To obtain this impedance change within a practical period of time, any charge that is within the diode at the transition must be removed. This is accomplished by a naturally occurring reverse diode current forced by the polarity reversal of inverter 10.

The diode transition from the conducting state, substantially zero ohms, to the non-conducting state, extremely high ohms, is accomplished during a very short time interval. Therefore, when the diode transitions to an off state, stored energy in the leakage inductances, $I^2L$, will attempt to develop reverse voltage spikes on the diode during the turn off transition. This may be expressed in this case as e~Li dz/dt where dz/dt is the rate of change of diode impedance at diode turn off, i is the dynamic current at turn off, and L is the series inductance linking the diode terminals with the energy sink, bank capacitor 16 of inverter 10.

To address the above situation, it has in certain instances been found to be beneficial to associate auxiliary winding 32 in a close relationship to secondary transformer winding 22 to absorb energy which is generated due to diode transitioning, and particularly the transition to an off state where energy within the diode is going to attempt to develop a voltage spike on rectifier diodes 24a–24b. By positioning auxiliary winding 32 in close relationship to rectifier output circuit 20, auxiliary winding 32 will, to some extent, remove energy from diodes 24a–24b and return it to capacitor 16 of inverter circuit 10.

This is a benefit of the present invention in that it is known that diodes rated for use at higher voltages are not as efficient as diodes rated for lower voltages. For example, a diode having a 400 voltage rating capability is generally not as efficient as a diode rated for use at 200 volts. One reason is the higher forward drop is associated with a higher voltage diode. Another reason is the higher reverse current required and thus available as energy to induce reverse voltage spikes for the higher voltage rated diode. Therefore, the higher the rated voltage capability of a diode the greater the losses they will exist.

The present invention allows diodes having lower voltage ratings to be used in rectifier output circuit 20, by reducing the magnitude of the voltage spikes which can occur in the rectifier diodes 24a–24b. As a specific example the inventors have examined a converter circuit which does not use energy recovery circuit 30 of the present invention and determined that voltage diodes capable of handling up to 400 volts were required. Thereafter, using energy recovery circuit 30 in the same converter circuit, it was possible to use diodes rated for 200 volts.

Attention is now directed to the overshoot voltage which can be developed through the transfer of energy from primary transformer winding 12 to secondary transformer winding 22. Unlike existing circuits which attempt to limit this overshoot voltage by clamping off inductive energy, such as the energy stored in series inductance 19, when excessive energy is developed, in order to prevent it from entering the primary winding 12 of transformer T, there is no such clamping off of inductive energy in the present invention. Rather, the circuit of FIG. 2 allows energy stored in the inductances, such as inductance 19, to be transmitted through transformer T throughout operation of the circuit. When, due to the inductances, a voltage more than a predetermined value is transmitted through primary transformer winding 12, auxiliary winding 32 receives this voltage and the diode bridge 34a–34d acts to place this excess voltage between voltage rails 18a and 18b, thereby storing the excess voltage in bank capacitor 16.

As previously noted, it is to be appreciate that while series inductance 19 is shown in FIG. 2 as being an external separate element, it is also possible that this inductance is part of the transformer winding 12 itself.

Figure 3:
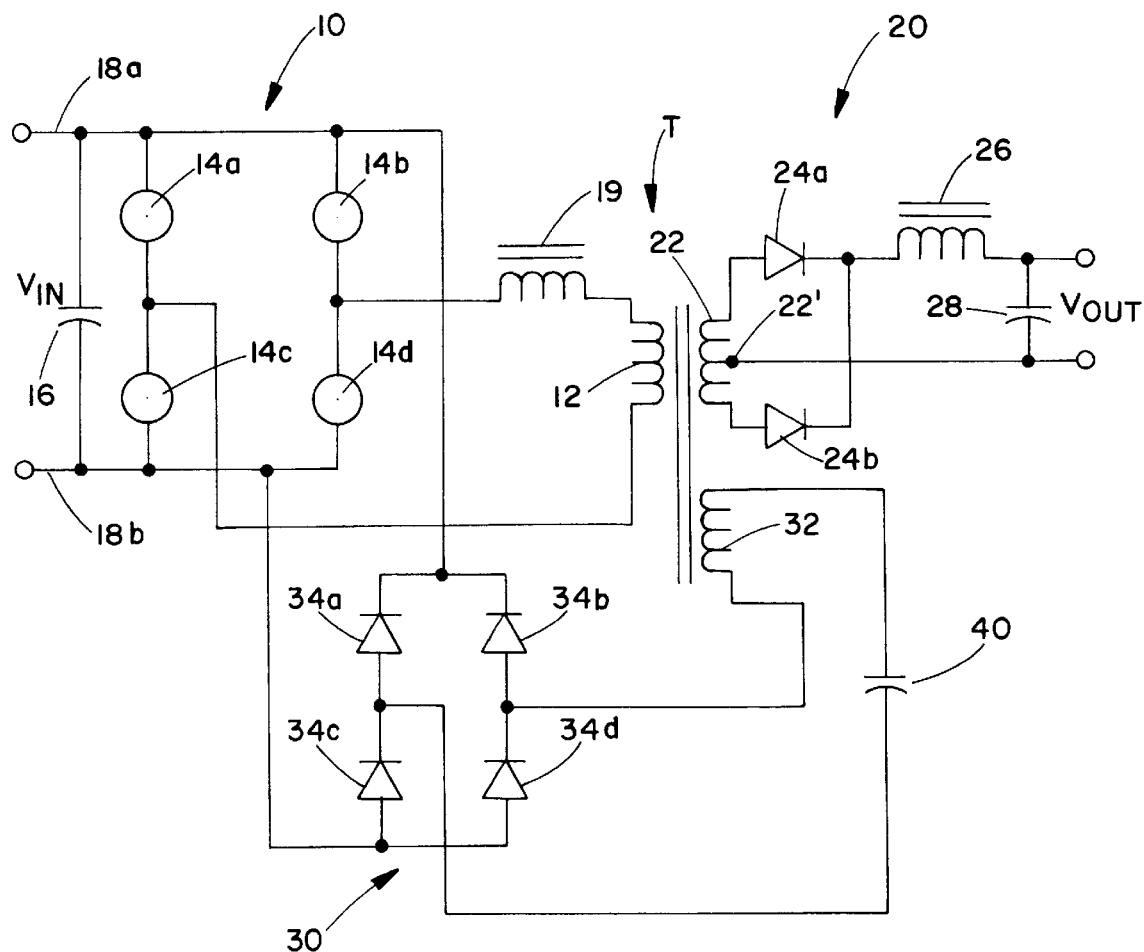
FIG. 3 is a more detailed schematic of the circuit of FIG. 1 including a balancing capacitor in the energy recovery circuit used to maintain a balanced waveform within the energy recovery circuit.

Turning attention to FIG. 3, this figure is substantially equivalent to FIG. 2 except that capacitor 40 is inserted in series with auxiliary winding 32. While FIG. 3 illustrates capacitor 40 in series in a particular side of the winding, it is to be appreciated that the capacitor may be placed in series on either side of auxiliary winding 32. Capacitor 40 acts to block DC unbalances from being generated in the waveform supplied to inverter 10. It is noted that series capacitor 40 is especially effective in a voltage mode of operation and may not be necessary when the circuit is being operated in a current mode. It is also to be appreciated the present circuit may be used in either a current or voltage mode.

Figure 4:
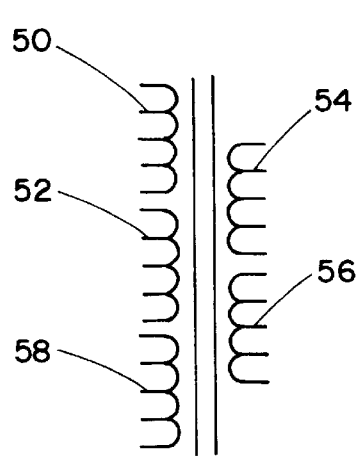
FIG. 4 illustrates the winding arrangement for a converter circuit according to the teachings of the present invention having two primary transformer windings, a single secondary transformer winding and two auxiliary windings for the energy recovery circuit.
Figure 5:
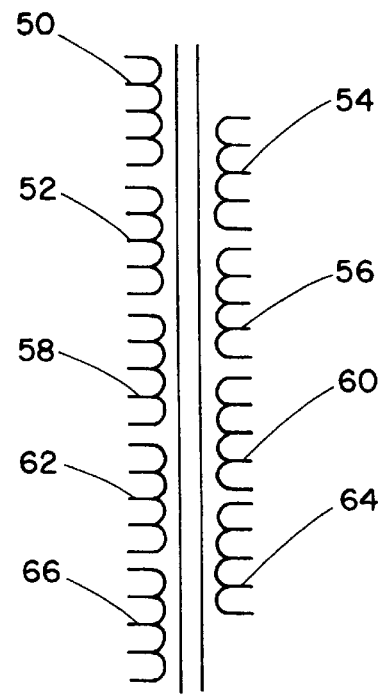
FIG. 5 illustrates a winding arrangement for a converter according to the teachings of the present invention having three primary transformer windings, two secondary transformer windings and four auxiliary windings for the energy recovery circuit.

Turning attention to FIGS. 4 and 5, as previously discussed the physical inter-relationship between the primary transformer winding 12, secondary transformer winding 22 and auxiliary winding 32 can be used to improve the effectiveness of energy recovery circuit 30.

FIG. 4 illustrates the sequence of an arrangement which has been found to be beneficial for a converter circuit having two primary transformer windings and a secondary transformer winding. This arrangement sets out a pattern of a first primary transformer winding 50 associated next to a first auxiliary winding 52, followed by secondary transformer winding 54, second auxiliary winding 56 and finally second primary transformer winding 58.

FIG. 5 illustrates an arrangement of windings for a converter circuit according to the teachings of the present invention where the converter circuit includes three primary transformer windings and two secondary windings. This configuration is similar to that in FIG. 4 in that the construction includes first primary transformer winding 50 next to first auxiliary transformer winding 52, which is associated next to first secondary transformer winding 54, followed by second auxiliary transformer winding 56 and then second primary transformer winding 58. Thereafter the remaining windings follow with third auxiliary transformer winding 60 associated with second secondary transformer winding 62, which is located adjacent to fourth auxiliary winding 64, which in turn is associated with third primary transformer winding 64. It is to be appreciated that the simplest transformer winding arrangement, primary-auxiliary-secondary, will benefit from this circuit. It is also to be appreciated that each of the three types of windings may be connected in series or parallel.

In tests performed by the inventors it has been found that a close association between the windings increases the efficiency of the energy recovery circuit 30. Particularly, locating the auxiliary windings between and in close association with the primary and secondary windings has been found to enhance the operation of energy recovery circuit 30.

Turning attention to FIGS. 6–11, various waveforms corresponding to the circuits shown in FIGS. 2 and 3 are illustrated. It is to be appreciated that FIGS. 6–11 illustrate waveforms of points in the circuits of FIGS. 2 and 3 when the input voltage is a nominal 400 volts DC (approximately 385 in actual measurement) and the output voltage is 53 volts and output current is 45 amps.

Figure 6:
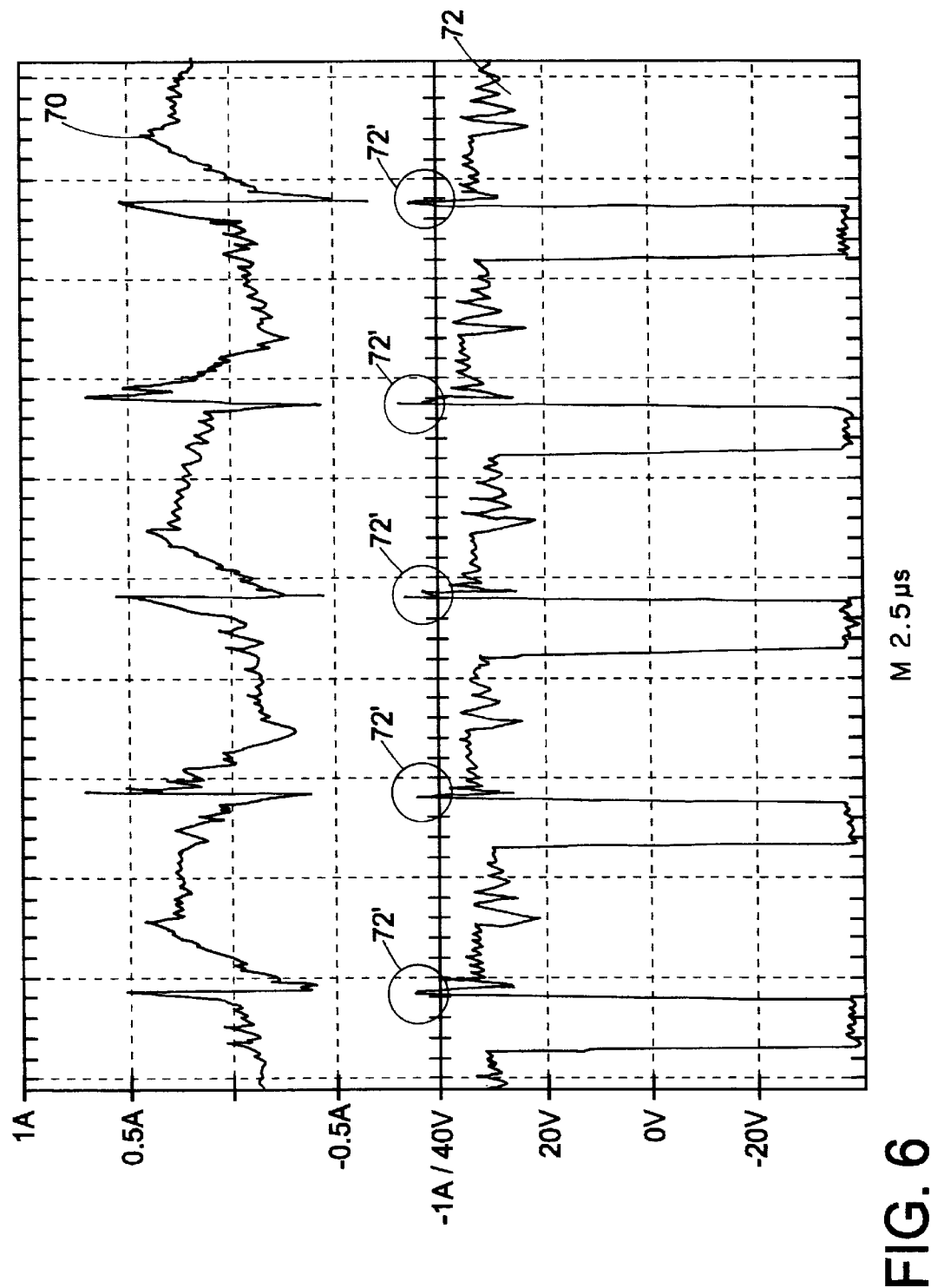
FIG. 6 illustrates the current of the auxiliary winding in comparison to the voltage output at the cathodes of the rectifier diodes to output common.

FIG. 6 illustrates that the current in the auxiliary winding will rise at a fast rate to a peak value. It is noted that without energy recovery circuit 30, the current shown in waveform 70 would be delivered to diodes 24a, 24b of rectifier output circuit 20 at a value multiplied by the ratio of the turns of transformer T, winding 32 divided by the turns of winding 22. It can be seen by reviewing waveforms 70 and 72, if energy recovery circuit 30 were not used, voltage spikes 72' of waveform 72 would be greatly increased, or to reduce the voltage spikes significant lossy energy absorbing circuits would be required.

Waveforms 70,72 show the timing relationship between current in auxiliary winding (70) and the output voltage measured from center-tap winding 22' and the cathodes of rectifiers 24a and 24b (72).

Figure 7:
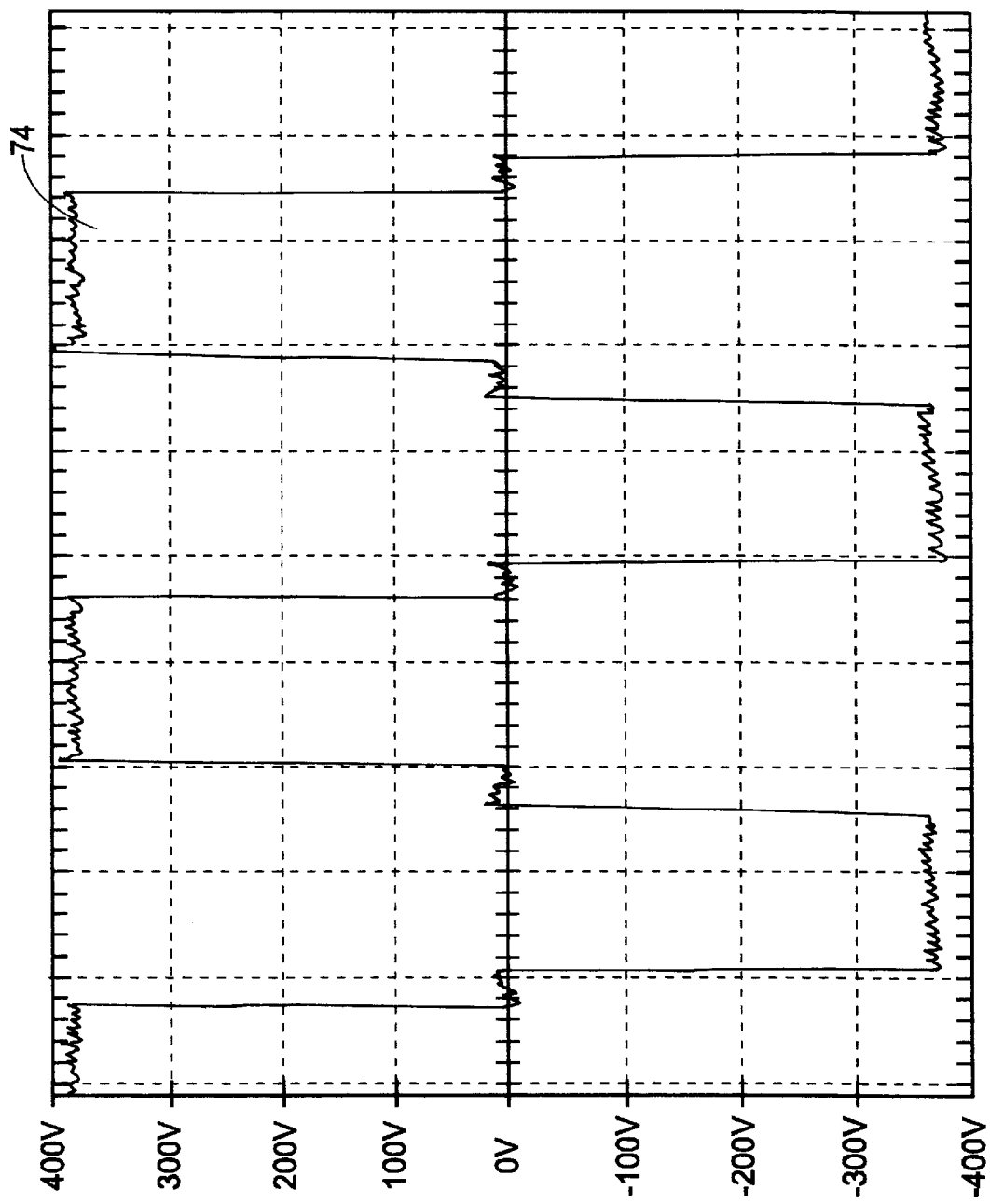
FIG. 7 shows a waveform of the output voltage of the FET bridge.

FIG. 7 illustrates a waveform 74 which is the output of the FET bridge.

Figure 8:
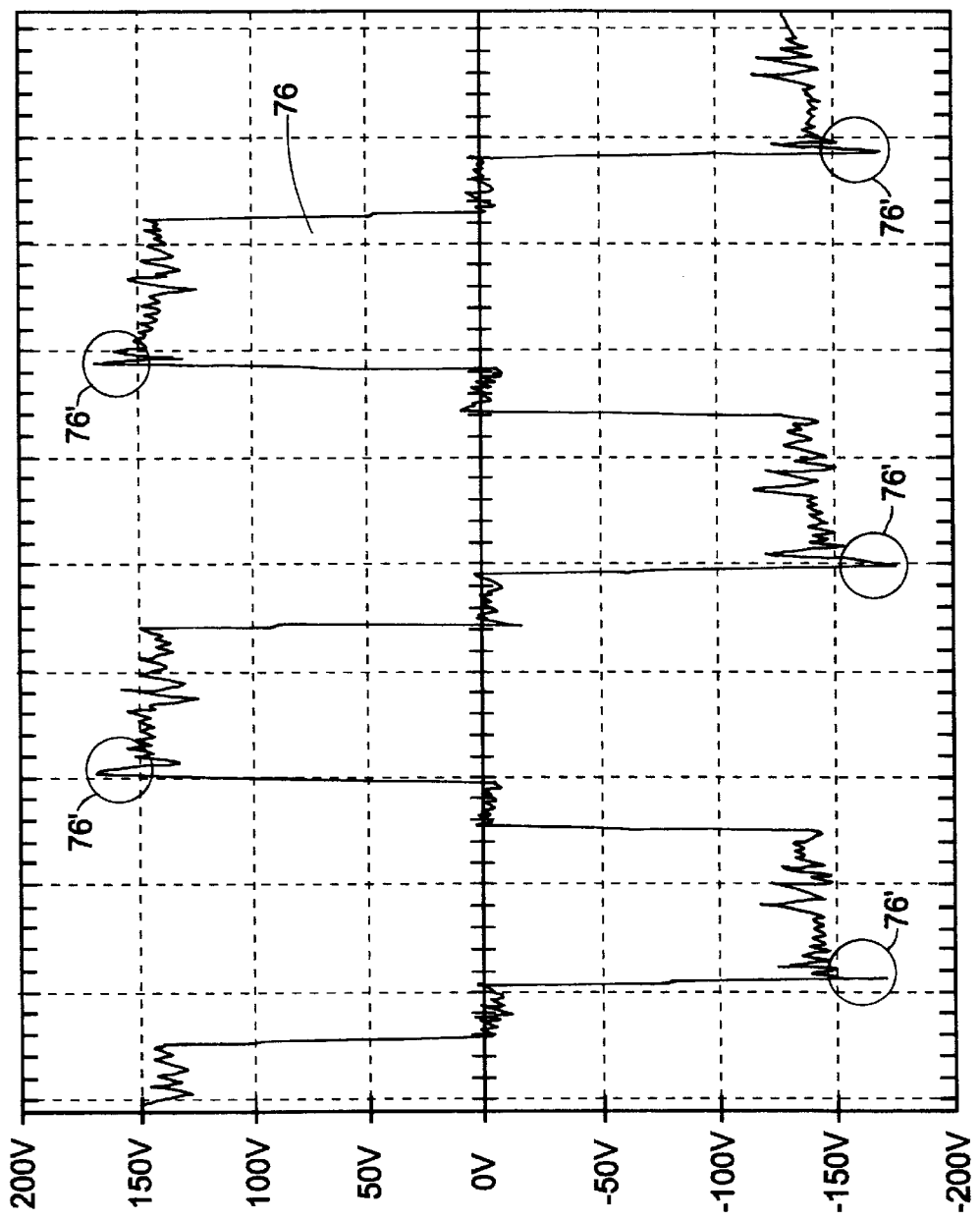
FIG. 8 illustrates a waveform of the secondary winding output voltage.
Figure 9:
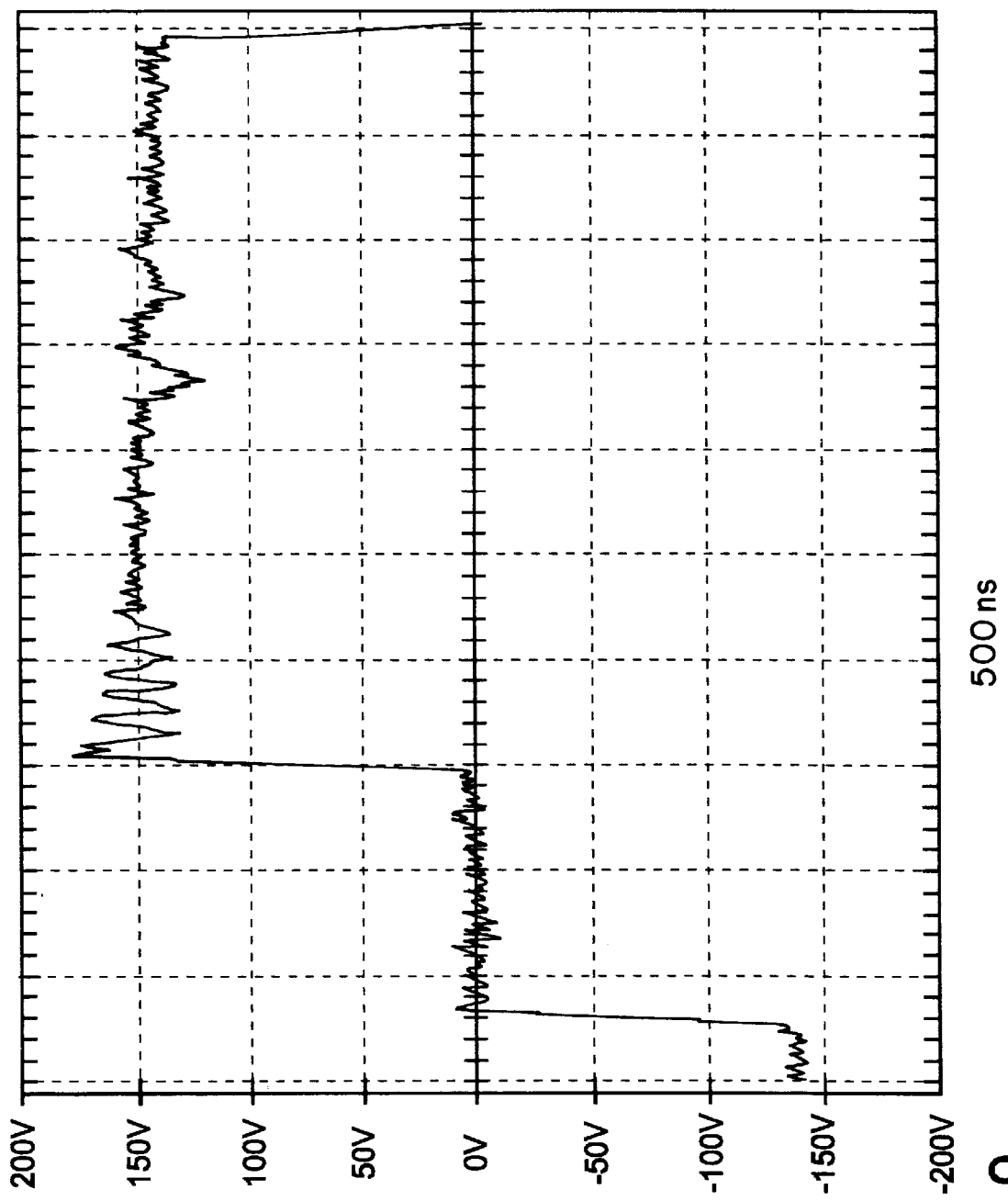
FIG. 9 illustrates an expanded view of the waveform of FIG. 8.

FIG. 8 shows a secondary winding voltage waveform 76 taken between the anodes of diodes 24a, 24b. The ideal output of the pulses at this location is approximately 150 volts. As can be viewed in waveform 76, a spike voltage element 76' is located at transitions of the waveform. FIG. 9 is an expanded tracing of waveform 76. Particularly, whereas each division on the time scale in FIG. 8 is for 2.5 microseconds, FIG. 9 expands this scale where each division is for 500 nanoseconds. This enlarged view shows more clearly that spike voltage 76' is approximately 20 volts above the desired output. Therefore, a diode used for rectification such as diodes 24a and 24b needs to have the capability of handling 170 volts. Under this construction it is possible, therefore, to use 200 volt rated diodes.

On the otherhand, in circuits built by the inventors without energy recovery circuit 30, it has been found that voltage spike 76' would be 70 volts or greater. This being the case, it would be necessary to use a diode capable of handling more than 200 volts. Therefore, it would be necessary to use a 400 volt rated diode. The ability to use lower rated diodes is beneficial since, as previously discussed, diodes having higher voltage ratings are less desirable in their response and efficiencies than diodes of lower voltage ratings.

It is noted that the output at the secondary winding is desired to be approximately 150 volts though the output from the FET bridge is approximately 375 to 380 volts. This is true since in the present embodiment the inventors have used a primary transformer winding of 21 turns and a secondary transformer winding of 8 total turns (4 on either side of center-tap 22'). It is to be appreciated that these are generalized values, are provided simply as additional detail and the present circuit can be used with varying input values and turns ratios.

Figure 10:
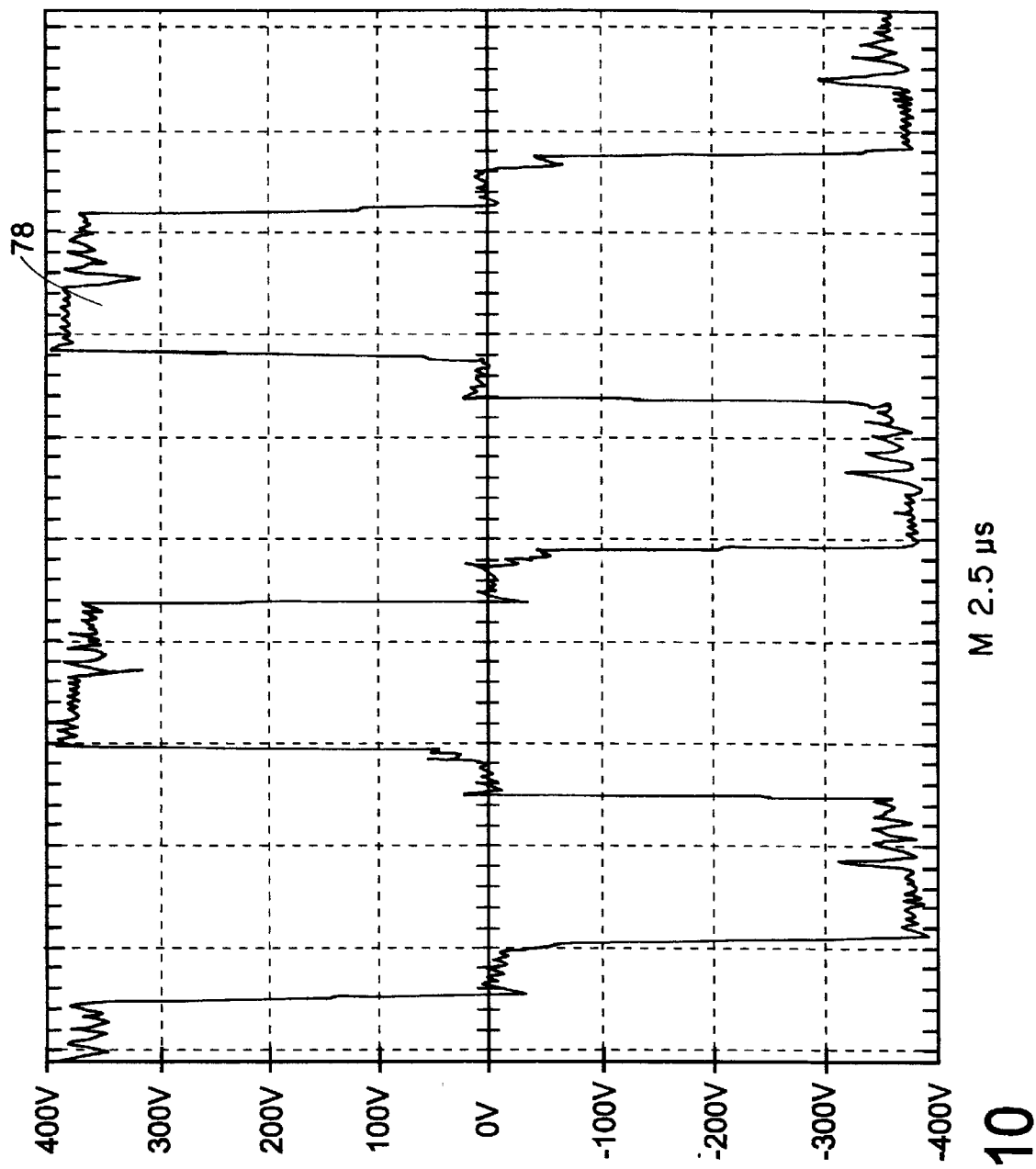
FIG. 10 is a waveform representing the auxiliary winding voltage.

FIG. 10 provides a voltage waveform 78 of auxiliary winding 32. It may be noted the voltage on auxiliary winding 32 is substantially equivalent to the voltage of the FET bridge of FIG. 7 as shown by waveform 74. There are, however, certain portions of the waveform 78 where the auxiliary winding voltage is slightly greater than the output voltage of the FET bridge. This occurs because the auxiliary winding voltage is supplied to the diode bridge, which is connected across bank capacitor 16 of converter circuit 10. Bank capacitor 16, which is the recipient of energy from the auxiliary winding maintains a relatively constant DC voltage even though energy flows in and out of bank capacitor 16. Further, the two diodes drop voltage in the energy being sent to capacitor 16, whereas the voltage from the FET bridge includes voltage drops in the FETs due to the drain to source "on" resistance of the FETs. These factors contribute to waveform 78 at times being slightly greater then waveform 76.

Figure 11:
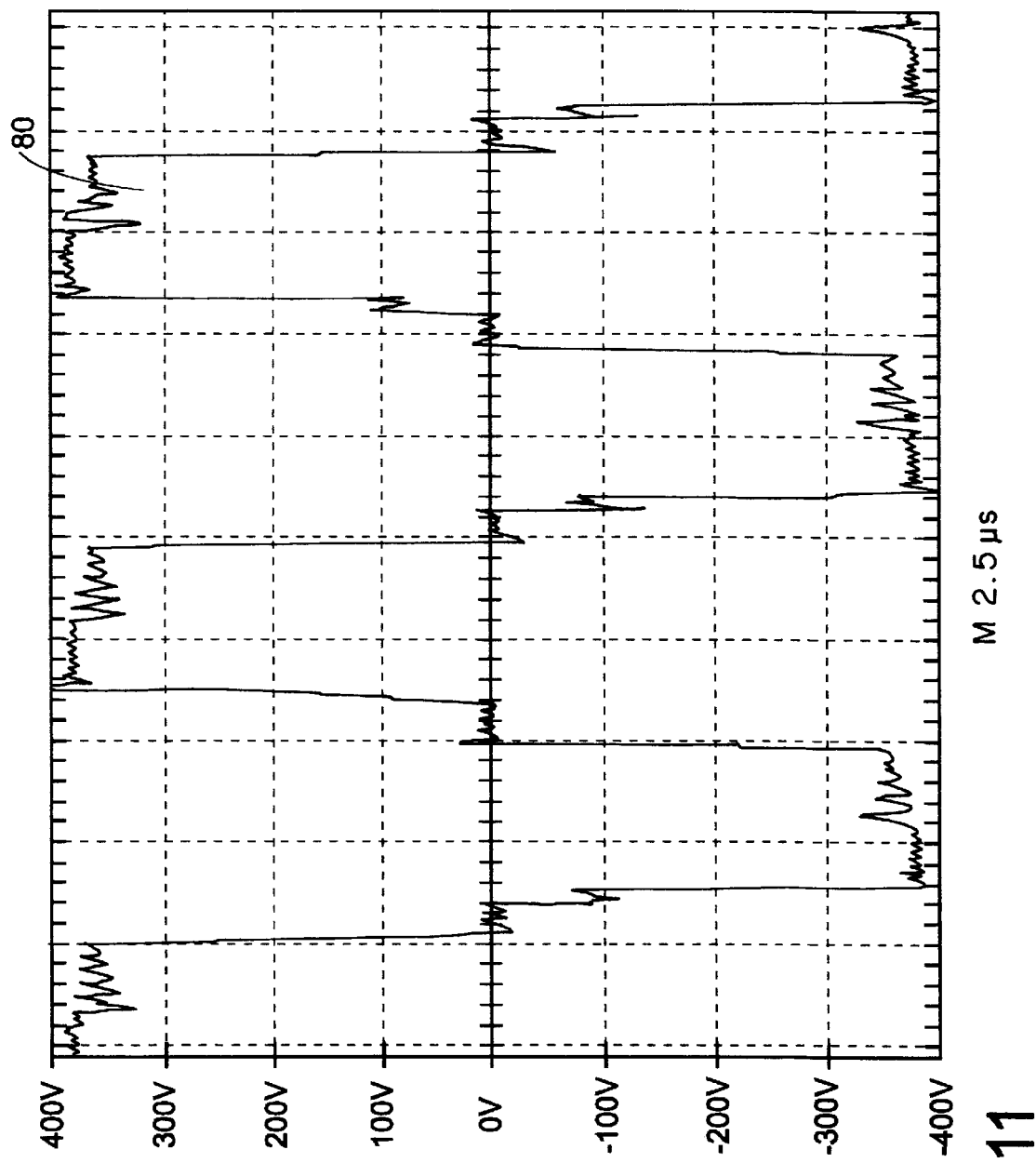
FIG. 11 represents the primary winding voltage.

FIG. 11 provides a waveform 80 representing the voltage at the primary transformer winding 12. This waveform is substantially similar to the FET output waveform of FIG. 7. However, it may be noticed this waveform is not as clean as the FET output bridge voltage. The differences in this waveform are due to energy absorbed in the series inductance 19 or other leakage inductances of the transformer T.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A converter circuit comprising:
   a primary side switching circuit having a primary transformer winding;
   a secondary side rectifier circuit having a secondary transformer winding magnetically coupled to the primary transformer winding for transferring energy from the primary transformer winding to the secondary transformer winding; and
   an energy recovery circuit having (i) an auxiliary winding associated with the primary transformer winding and the secondary transformer winding and (ii) an energy passing section connected to the primary side switching circuit and the auxiliary winding, wherein the auxiliary winding absorbs selected amounts of energy from at least one of the primary side switching circuit and the secondary side rectifier circuit and returns the selected energy to the primary side circuit, through the energy passing section.

2. The converter circuit according to claim 1, wherein the primary side switching circuit includes switches which are formed as a field effect transistor (FET) bridge connected to the primary transformer winding, and the switches of the switching circuit are designed to have minimal drain voltage during switch turn on.

3. The converter circuit according to claim 1, wherein the energy recovery circuit includes a capacitance connected in series with the auxiliary winding.

4. The converter circuit according to claim 1, wherein the energy passing section includes a diode bridge connected between the primary side switching circuit and the auxiliary winding.

5. The converter circuit according to claim 1, wherein the energy recovery circuit includes a capacitance connected in series with the auxiliary winding and a diode bridge connected between the auxiliary winding, with the capacitance in series, and the primary side switching circuit.

6. The converter circuit according to claim 1, further including a second primary winding and a second auxiliary winding, wherein all the windings are arranged in the transformer in relationship with each other having an order of the primary transformer winding, the auxiliary winding, the secondary transformer winding, the second primary transformer winding, the second auxiliary winding and the second primary transformer winding.

7. The converter circuit according to claim 1, wherein the selected energy absorbed by the auxiliary winding includes energy stored in leakage inductance of a transformer comprised of the primary transformer winding and the secondary transformer winding.

8. The converter circuit according to claim 1, wherein the energy recovery circuit is configured in relationship to the primary side switching circuit and the secondary side rectifier circuit to limit energy above a predetermined level from passing from the primary winding to the secondary winding and to reduce leakage inductance between the auxiliary and secondary windings.

9. The converter circuit according to claim 1, wherein the primary side switching circuit includes an inductance in series with the primary transformer winding.

10. In a phase shifted pulse-width-modulated soft-switching full bridge DC/DC converter having first and second power-supply rails intercoupled by semiconductor switching devices characterized by switching losses and exchanging energy through a transformer coupled to at least one output rectifier, the transformer having a first transformer winding connected to a leg of the inverter and a secondary transformer winding connected to the at least one output rectifier and characterized by leakage inductance with the full-bridge DC/DC converter controlled by a phase-shifted pulse-width modulator, the improvement comprising:
   an auxiliary winding associated with the primary transformer winding and the secondary transformer winding; and
   an energy passing section connected to terminals of the auxiliary winding and to the first and second power-supply rails of the converter,
   wherein the auxiliary winding is associated with the primary transformer winding and the secondary transformer winding such that the auxiliary winding absorbs energy from at least one of the primary transformer winding and the secondary transformer winding and provides at least a portion of the absorbed energy to the converter.

11. An energy recovery and clamping circuit for providing energy to an inverter and for clamping output diode reverse voltage to a primary bank voltage of the inverter, the inverter configured to pass energy through a transformer linking the inverter to an output rectifier circuit, the transformer including a primary transformer winding connected to the inverter and a secondary transformer winding connected to the output rectifier circuit, the energy recovery and clamping circuit comprising:

an auxiliary winding magnetically linked with the primary transformer winding and the secondary transformer winding of the transformer such that excessive amounts of energy from the primary transformer winding generated due to series inductance of the inverter, and trapped energy, including parasitic leakage inductance within the secondary transformer winding is absorbed by the auxiliary winding; and an energy passing section connected to terminals of the auxiliary circuit and to the inverter circuit, wherein at least a portion of the energy absorbed by the auxiliary circuit is provided to the inverter.

12. The circuit according to claim 11, wherein the switching section is a diode bridge.

13. The circuit according to claim 11, wherein the inverter further includes an inductance in series with the primary transformer winding.

14. The circuit according to claim 11, further including a capacitance in series with the auxiliary winding.

* * * * *